Patented Feb. 7, 1950

2,496,955

UNITED STATES PATENT OFFICE 2,496,955

1-ALKYL-4-PYRROLIDINOETHYLAMINO-PIPERIDINES

Robert H. Reitsema, Kalamazoo, Mich., assignor to The Upjohn Company, Kalamazoo, Mich., a corporation of Michigan No Drawing. Application April 30, 1948, Serial No. 24,421

4 Claims. (Cl. 260—293)

This invention relates to 1-alkyl-4-(beta-pyrrolidinoethyl)-piperidines and acid salts thereof.

The compounds of this invention may be represented by the formula:

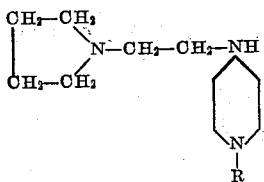

wherein R is a lower-alkyl group containing from one to eight carbon atoms inclusive.

The products of this invention are useful intermediates in the synthesis of therapeutically active tertiary amines, as disclosed in my copending application Serial No. 24,425, now Patent 2,476,914.

These amines are high-boiling liquids, soluble in most organic liquids and only slightly soluble in water. They are basic substances capable of forming salts with mineral acids such as hydrochloric, hydrobromic, and sulfuric; organic carboxylic acids such as acetic, propionic, citric, and tartaric; and strongly acidic phenols such as picric acid. The compounds of this invention, having two basic amino nitrogen atoms, form stable salts with one or two equivalents of acid, the salt obtained being dependent upon the quantity of acid used in its formation.

The compounds of this invention may be prepared by the reaction of a 1-alkyl-4-piperidone with beta-pyrrolidinoethylamine followed by reduction of the reaction product. Customarily the condensation and reduction are conducted by mixing the reactants at room temperature or slightly above and without the isolation of an intermediate product. The reduction is preferably carried out by means of hydrogen under pressure and a catalyst such as platinum oxide, Raney nickel, or palladium. The conditions of the reduction such as temperature and pressure are not critical, and the reductive alkylation may, for example, be carried out at room temperature and a hydrogen pressure of 50 pounds per square inch. Higher temperatures and pressures, while operative, are not essential. A diluent, inert to the products and reactants, such as alcohol or benzene, may be used if desired, but is not required by the process.

The products of the reaction may be isolated in ways known to the art. Filtration to remove catalyst followed by fractionation is a satisfactory method of isolation.

Salts of the amines are prepared by mixing a solution of the amine with a stoichiometric quantity of the selected acid followed by evaporation of the solution to dryness. Other methods of preparing amine salts known to the art may also be used.

The following examples are illustrative of the invention but are not to be construed as limiting.

Example 1.—Pyrrolidinoacetonitrile

To 142 grams of pyrrolidine maintained at 25 degrees centigrade was added a solution of 208 grams of sodium bisulfite dissolved in 200 milliliters of water. After addition was complete, 162 grams of 37 percent aqueous formaldehyde was added to the stirred solution while the temperature was maintained at 25–30 degrees centigrade. The temperature of the reaction mixture was then raised to about 60 degrees centigrade and 130 grams of potassium cyanide dissolved in 200 milliliters of water added over a period of about 45 minutes. The resulting milky solution was then heated at 95 degrees centigrade for an additional six hours. Upon cooling, the liquid was decanted from the settled solids, the upper layer of pyrrolidinoacetonitrile separated, and the aqueous layer extracted several times with 200-milliliter portions of ether. The ether extracts were combined with the oil first separated, dried, and the residual oil fractionated to give pyrrolidinoacetonitrile, distilling at 86 degrees centigrade at a pressure of 22 millimeters of mercury; $n_D^{26}=1.4558$. Picrate: M. P. 153–154 degrees centigrade with decomposition.

Example 2.—Beta-pyrrolidinoethylamine

One hundred sixty-five grams of pyrrolidinoacetonitrile was reduced in suitable apparatus under an initial hydrogen pressure of 3690 pounds per square inch and a temperature of 85 degrees centigrade in the absence of a solvent, using 10 grams of Raney nickel as catalyst. After five hours, about 81 percent of the calculated quantity of hydrogen had been absorbed, whereupon the mixture was taken from the bomb, separated from catalyst, and fractionated. There was obtained 63.5 grams of beta-pyrrolidinoethylamine, boiling at 159–163 degrees centrigrade at 750 millimeters of mercury. The picrate melted with decomposition at 213–220 degrees centigrade.

Example 3.—1-ethyl-4-(N-beta-pyrrolidinoethylamino)-piperidine

Thirty-four and two-tenths grams of beta-pyrrolidinoethylamine and thirty-eight and one-tenth grams of 1-ethyl-4-piperidone [J. Am.

Chem. Soc. 68, 1239 (1946)] were mixed at room temperature. One hundred milliliters of absolute alcohol was then added and the solution hydrogenated in suitable apparatus under an initial hydrogen pressure of 50 pounds per square inch at room temperature using a platinum oxide catalyst. After absorption of hydrogen had ceased, catalyst was removed and the resulting solution fractionally distilled. There was thus obtained 34 grams of 1-ethyl-4-(N-beta-pyrrolidinoethylamino)-piperidine, boiling at 101–104 degrees centigrade at a pressure of 0.05 millimeter of mercury. The dipicrate melted at 255 degrees centigrade with decomposition.

*Example 4.—1-methyl- and 1-propyl-4-(N-beta-pyrrolidinoethylamino)-piperidine*

In the manner of the preceding Example, 1-methyl- and 1-propyl-4-piperidone are reacted with beta-pyrrolidinoethylamine to yield 1-methyl- and 1-propyl-4-(pyrrolidinoethylamino)-piperidine respectively, high boiling viscous liquids which may be converted to salts such as the dihydrochloride and dipicrate by the procedure indicated previously.

Other compounds within the scope of the present invention include 1-isopropyl-, 1-butyl-, 1-amyl-, and 1-hexyl-4-(N-beta-pyrrolidinoethylamino)-piperidine and salts thereof which are prepared by substituting the selected 1-alkyl-4-piperidone in the procedure of Example 3 and converting the free amine to the salt, if desired, by the indicated procedure.

Various modifications may be made in the present invention without departing from the spirit or scope thereof, and it is to be understood that I limit myself only as defined in the appended claims.

I claim:

1. A compound selected from the group consisting of 1-lower-alkyl-4-(beta-pyrrolidoethylamino)-piperidines and acid salts thereof.

2. 1 - ethyl-4 - (beta - pyrrolidinoethylamino) - piperidine.

3. 1-ethyl - 4 - (beta - pyrrolidinoethylamino) - piperidine dipicrate.

4. The process for the preparation of a 1-alkyl-4-(beta-pyrrolidinoethylamino)-piperidine which includes the step of hydrogenating, under a pressure of hydrogen and in the presence of a hydrogenation catalyst, a 1-alkyl-4-(beta-pyrrolidinoethylimino)-piperidine to produce a 1-alkyl-4-(beta-pyrrolidinoethylamino)-piperidine, and separating the products of the hydrogenation reaction.

ROBERT H. REITSEMA.

REFERENCES CITED

The following references are of record in the file of this patent:

UNITED STATES PATENTS

| Number | Name | Date |
|---|---|---|
| 2,422,013 | Haury et al. | June 10, 1947 |

FOREIGN PATENTS

| Number | Country | Date |
|---|---|---|
| 365,214 | Great Britain | Jan. 21, 1932 |

OTHER REFERENCES

Cerkovnikov: Chem. Abstracts, vol. 37 (1943), pages 125–127.